June 18, 1968 R. L. CALDWELL ET AL 3,389,257
PULSED NEUTRON SOURCE COMPRISING A PLURALITY OF ALPHA
SOURCES AND ASSOCIATED TARGETS WITH A
ROTATABLE SHUTTER THEREBETWEEN
Filed Sept. 15, 1964 3 Sheets-Sheet 1
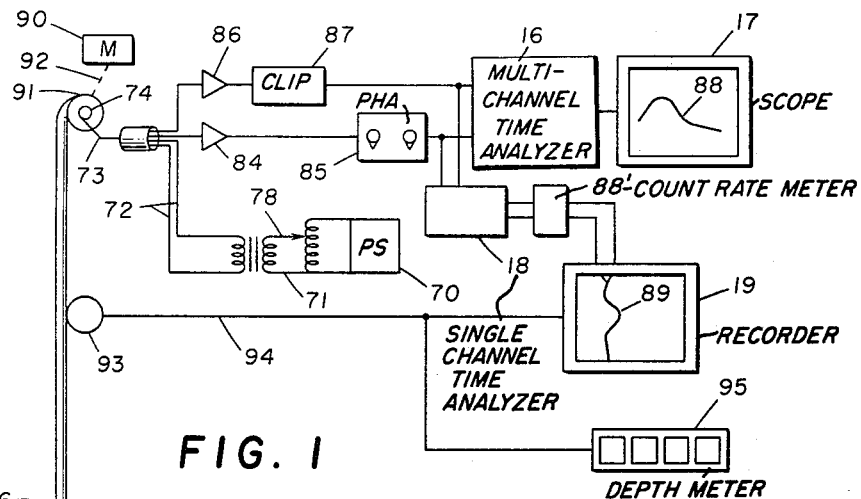
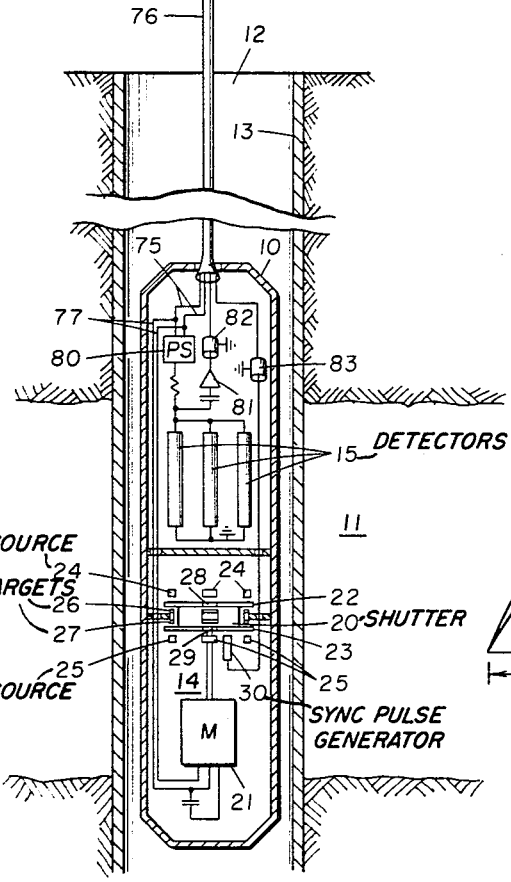
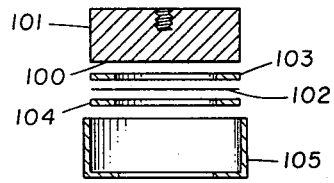
RICHARD L. CALDWELL
WYATT W. GIVENS
INVENTORS
BY
*Arthur F. Zobal*
ATTORNEY

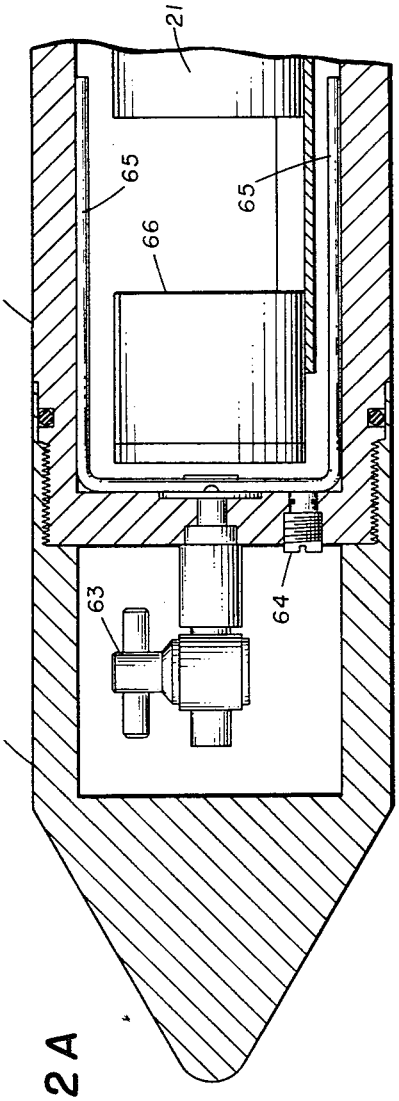
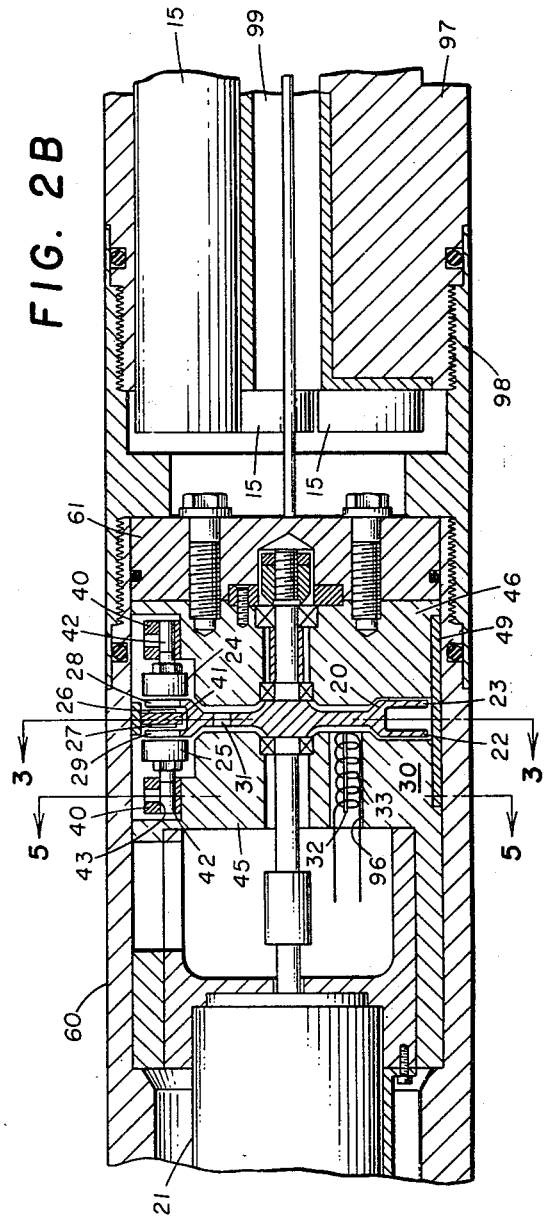

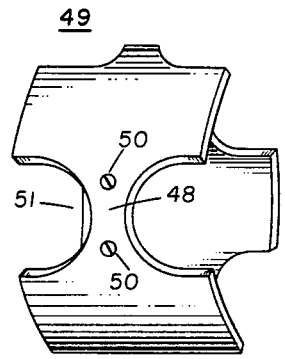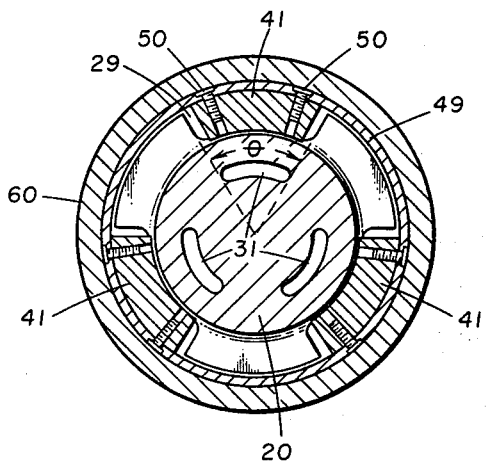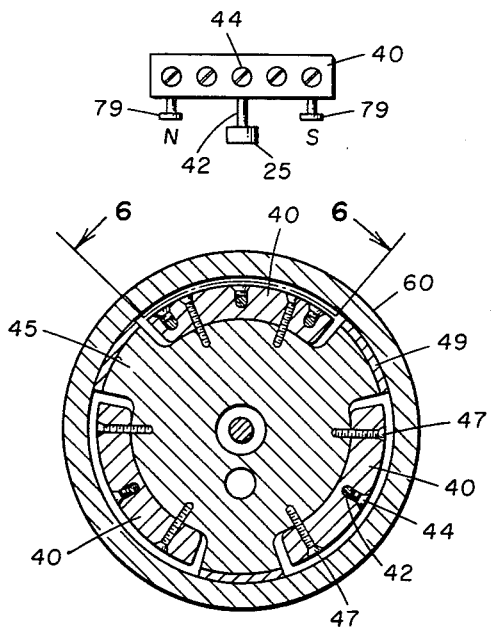

United States Patent Office 3,389,257
Patented June 18, 1968

3,389,257
PULSED NEUTRON SOURCE COMPRISING A PLURALITY OF ALPHA SOURCES AND ASSOCIATED TARGETS WITH A ROTATABLE SHUTTER THEREBETWEEN
Richard L. Caldwell and Wyatt W. Givens, Dallas, Tex., assignors to Mobil Oil Corporation, a corporation of New York
Filed Sept. 15, 1964, Ser. No. 396,778
32 Claims. (Cl. 250—84.5)

ABSTRACT OF THE DISCLOSURE

This specification describes a mechanically actuated pulsed neutron source formed by a plurality of alpha sources spaced from a plurality of associated targets and having a rotatable shutter therebetween for controlling the passage of alpha particles to the targets for producing bursts of fast neutrons. The sources and targets are geometrically positioned and the shutter is constructed to allow all of the targets simultaneously to be irradiated periodically with alpha particles to increase the neutron yield. The sources and targets are maintained in a chamber which is filled with helium at about atmospheric pressure to increase the neutron yield further.

This invention relates to pulsed radiation logging and more particularly to a system including a pulsed radiation source for use in logging the formations traversed by a borehole.

In present day logging operations, pulsed radiation logging has promise of becoming a very important technique in the search for oil. In this technique, the formations are irradiated from a source with bursts of primary radiation spaced in time for the production of secondary radiation for detection in the borehole. Measurements are made of secondary radiation detected after each burst of primary radiation to obtain information about the formations under investigation.

Difficulties have been encountered, however, in obtaining a suitable pulsed source which can be employed for borehole use. For example, the commercially available pulsed sources are accelerator-type neutron sources which include a sealed neutron generator tube containing a deuterium ion source and a tritium target. These types of sources are very complex and furthermore require an extremely high voltage (of the order of 100 kev.) to generate the desired neutron output. Difficulties have been encountered in providing such high voltage downhole and in providing reliable associated circuits for controlled operation of the neutron generator tube.

In accordance with the present invention, there is provided a simple and practical mechanically pulsed source and system for carrying out borehole logging. In one aspect, the pulsed source comprises means for supporting at least one source of radiation in a first plane and means for supporting at least one source of radiation in a second plane spaced from the first plane. The sources are located opposite each other in the two planes and are positioned to direct radiation toward a zone located in a third plane intermediate the sources. Target material located in the intermediate zone forms a target for radiation emitted by both sources and produces primary radiation when irradiated with radiation from the sources. Control means is provided for controlling the passage of radiation from the sources to the target material for the production of bursts of primary radiation. In the embodiment disclosed, the control means periodically allows radiation from both of the sources simultaneously to irradiate the target material for the production of the bursts of primary radiation which originates from a localized region intermediate the sources.

In a more detailed aspect, the control means includes structure supported for movement between the sources and target material for shielding the target material from radiation emitted by the sources. Means is provided for periodically moving and removing the structure respectively intremediate and from intermediate the sources and target material for the production of bursts of primary radiation. More particularly, the control means comprises first means supported for rotation intermediate one of the sources and the target material and second means supported for rotation intermediate the other of the sources and the target material. The first and second means are of a selected material having a thickness sufficient to be impervious to radiation emitted by the sources. In addition, the first and second means each have at least one aperture extending therethrough. The apertures are in alignment with each other whereby at least at one angular position of the control means, one of each of the apertures is located intermediate the target material and one of each of the sources to allow radiation from both of the sources simultaneously to irradiate the target material. Rotation of the control means periodically allows radiation from the sources to irradiate the target material for the production of bursts of primary radiation.

Preferably a plurality of sources are supported in the first and second planes, one of each of the sources in the first plane being located opposite a source in the second plane. Target material is supported intermediate each pair of sources and provides a target for one of each of the sources. As will be described hereinafter, the first and second means of the control means each are provided with a plurality of apertures to allow all of the targets simultaneously to be irradiated with radiation from their associated sources in the production of bursts of primary radiation.

The control means not only is utilized in the production of bursts of primary radiation but also is utilized in the production of sync pulses employed for conditioning a radiation analyzing system. In the system disclosed, upon passage of the apertures intermediate the sources and targets, the control means actuates a sync pulse generating means for the production of sync pulses concomitant with the production of each burst of primary radiation.

In a further aspect, the sources are characterized by the emission of alpha particles while the targets are characterized by the emission of fast neutrons when irradiated with alpha particles. Preferably, the sources employed are of polonium and the targets are of beryllium. In order to obtain a high neutron yield, a path of low energy loss is presented for the alpha particles in their passage to the targets via the apertures of the control means. More particularly, such a path allows alpha particles of relatively high energy to reach the targets. This is desirable in obtaining a high neutron yield since the yield from beryllium increases with the energy of the alpha particles interacting therewith. In a preferred embodiment, the path of low energy loss is obtained by enclosing the sources, targets, and control means in a chamber whose atmosphere is provided by a gas having a low stopping power for alpha particles. Preferably, the gas employed is helium at atmospheric pressure.

The use of polonium is preferred as an alpha source since it has a high specific activity. Polonium, however, has a short half life (of the order of 140 days) and must be replaced at relatively frequent time intervals in order to maintain the neutron output above a certain minimum level. This factor is significant from the standpoint of cost, especially in our system where we employ a plurality of sources.

We have found, however, that by employing a unique source-manipulating technique, we are able to employ sources of short half life, such as polonium, in our system for longer time periods than heretofore expected, thereby minimizing the number of sources required with time in the maintenance of the system. More particularly, as mentioned above, the system is adapted to support a plurality of sources and a plurality of targets. Initially a number of sources, less than the maximum number the system is adapted to support, are applied to the system to obtain a radiation output above the desired minimum value. Upon decay of the sources, the output is maintained above the minimum value by adding fresh sources until the maximum number is present in the system. Thereafter, at desired time intervals beginning with one of the sources initially applied to the system, the sources sequentially are replaced with fresh sources. The number of sources replaced at each time interval is less than the maximum number the system is adapted to support.

In actual logging operations, the pulsed source is operated in a manner to obtain optimum results in distinguishing between salt-water-bearing formations and oil-bearing formations. Optimum results are obtained for a given size aperture by rotating the control means at a predetermined angular velocity such that each burst of fast neutrons is of a time duration about equal to the time required for the intensity of thermal neutrons formed in the formations to reach substantially an equilibrium level in oil-bearing formations. The time between bursts is about equal to the time required for thermal neutrons to decay to background level in oil-bearing formations. In the embodiment disclosed, the control means is rotated at an angular velocity sufficient to produce bursts of fast neutrons at a repetition rate of the order of 600 bursts per second, the duration of each burst being of the order of 500 microseconds.

For further objects and advantages of the present invention and for a more complete understanding thereof, reference may be had now to the following detailed description taken in conjunction with the accompanying drawings, wherein:

FIGURE 1 illustrates a radioactive well logging system including a logging tool embodying the present invention;

FIGURES 2A and 2B are detailed enlargements in cross section of the lower portion of the logging tool of FIGURE 1;

FIGURE 3 is a cross section of the lower portion of the logging tool taken along the lines 3—3 of FIGURE 2B;

FIGURE 4 illustrates curves useful in understanding the present invention;

FIGURE 5 is a cross section of the lower portion of the logging tool taken along the lines 5—5 of FIGURE 2B;

FIGURE 6 illustrates a portion of the section of FIGURE 5 taken along the lines 6—6;

FIGURE 7 illustrates a sleeve employed in the lower portion of the logging tool; and FIGURE 8 illustrates a source of radiation employed in the logging tool.

Referring now to FIGURE 1, there is illustrated a borehole logging tool 10 for investigating the formations, for example, formation 11 traversed by a borehole 12 lined with iron casing 13. The borehole tool 10 comprises a pulsed radiation source 14 for irradiating formations with bursts of primary radiation for the production of secondary radiation. A detector system comprising a plurality of detectors 15 is employed to detect secondary radiation which has passed from the formations into the borehole. In response to the radiation detected, the detectors produce output pulses which are transmitted to the surface. At the surface, the pulses are applied to an analyzer 16 coupled to readout 17 for the production of a time decay spectrum, or to analyzer 18 coupled to a recorder 19 for the production of a continuous log. Sync pulses are produced by means in a borehole unit concomitant with the production of each burst of primary radiation and are applied to trigger the analyzers 16 and 18 whereby the radiation detected may be analyzed following each sync pulse.

The pulsed source 14 comprises a plurality of spaced sources of radiation positioned to irradiate a plurality of spaced targets for the production of primary radiation. A control means is provided for periodically controlling the passage of radiation from the sources to the targets to produce bursts of primary radiation. In the system disclosed, the sources are supported in two spaced planes with the targets located intermediate thereof. At a plurality of spaced positions, two targets are supported in a back-to-back arrangement intermediate two sources located in the two spaced planes. The control means comprises a member supported for rotation intermediate the sources and targets and having a plurality of apertures formed therethrough. Upon rotation of the member, the apertures periodically allow radiation from the sources to pass to the targets for the production of bursts of primary radiation. In the production of each burst of primary radiation, all of the targets effectively employed simultaneously are irradiated with radiation from each of their associated sources.

More particularly, as illustrated in FIGURE 1, the control means for controlling the passage of radiation from the sources to the targets comprises a wheel-shaped shutter-type member 20, cyclically driven by motor 21, and having projecting flanges 22 and 23 forming a groove in the rim. A plurality of spaced sources 24 are located in a first plane on one side of member 20 and a plurality of spaced sources 25 are located in a second plane on the other side of member 20. The system disclosed is adapted to support six sources and six targets. Normally, the number of sources employed in one plane is equal to the number of sources employed in the other plane. Three sources are supported at equally spaced positions (120° apart about the center of rotation) on each side of member 20 at a given radius. Each source on one side is located opposite a source on the other side. Target material comprising targets 26 and 27 are supported within the groove at three equally spaced positions intermediate opposite sources. As illustrated, at each position, two targets are supported in a back-to-back arrangement. Each source is positioned to direct radiation toward an intermediate target for the production of primary radiation, each source and associated target forming a source-target pair. The control means 20 is made of material which is impervious to radiation emitted from the sources. Each flange of the wheel-shaped member, however, has three equally spaced apertures respectively illustrated at 28 and 29 extending therethrough at the radius of sources and targets (see also FIGURES 2B and 3). Each aperture in one flange is in alignment with an aperture in the other flange. During each cycle of member 20, three bursts of primary radiation are produced. More particularly, upon rotation of member 20 and at three angular positions thereof, radiation from the sources passes through the apertures to the targets for the production of bursts of primary radiation. Due to the arrangement of the system, at each of the three angular positions of member 20, one of each of the apertures is located intermediate a target and associated source, thereby allowing all of the targets simultaneously to be irradiated with radiation from the sources.

In the system of the present invention, the control means 20 not only controls the passage of radiation from the sources to the targets but also controls a sync pulse generating means 30 for producing a sync pulse concomitant with the production of each burst of primary radiation. Referring to FIGURE 3, the control means 20 has three equally spaced apertures 31 formed therethrough. As illustrated, each aperture 31 is bounded by the same angle θ defining the limits of the apertures 28 and 29. The sync pulse generating means 30, illustrated in more detail in FIGURE 2B, comprises a magnetic pickup device which sequentially detects each aperture 31 upon rotation of the control means for the production of a sync pulse with each burst of primary radiation. The pickup device includes a magnetic core 32 surrounded by a coil 33 and located adjacent the control means 20 at the radius of apertures 31. The magnetic core 32 produces a magnetic field which is distorted by the appearance of each aperture 31 adjacent the coil. This causes voltage pulses to be induced in the coil for the production of sync pulses. More particularly, as each aperture 31 is rotated past the core 32, first and second voltage pulses of opposite polarity are induced in the coil 33 due to changes in the magnetic flux occurring through the coil respectively when the leading edge of each aperture 31 passes opposite the core 32 and when the trailing edge of each aperture 31 leaves the core 32. In the embodiment to be described, the peak value of the first and second pulses respectively occurs approximately midway of the rise and fall time of each burst of primary radiation. The pulses are applied to an impedance matching transformer (not shown), the output of which is applied to the surface by way of a signal cable. At the surface, the pulses are amplified and the leading pulse of each pair of pulses is clipped and applied to the analyzing circuits, as will be described hereinafter.

Referring again to the pulsesd source 14, this source preferably is of the type which emits bursts of fast neutrons. In the system disclosed, the sources 24 and 25 are alpha particle emitters and the targets 26 and 27 are of a material such as beryllium which emits neutrons when irradiated with alpha particles. A pulsed source of this nature has advantages in that it may be readily controlled by a relatively lightweight control means for the production of bursts of neutrons. This is due to the fact that alpha particles do not have a high penetrating power and are easily absorbed.

Since alpha particles are easily absorbed, however, even by air, we have found it desirable to position the sources and targets in an environment wherein the energy lost by the alpha particles upon reaching the targets is relatively low. This is preferred in the present system in order to obtain as high a neutron output as possible. More particularly, the nuerton output from beryllium is a function of the energy of the alpha particles interacting therewith and in fact increases with the alpha particle energy. This phenomenon is illustrated in Table A below which discloses the neutron yield versus alpha particle energy for a homogeneous mixture of polonium and beryllium.

TABLE A.—NEUTRON YIELD vs. ALPHA ENERGY

| Alpha Energy (mev.) | Neutron Yield from Beryllium (Neutrons per Million Alphas) |
| --- | --- |
| 3 | 2.7 |
| 4 | 26 |
| 5 | 61 |
| 5.3 | 77 |

From Table A it can be understood that in order to obtain a high neutron output, it is desirable to provide a medium of low energy loss for alpha particles to allow alpha particles of relatively high energy to reach the targets via the apertures 28 and 29 of control means 20. In the present system, this may be accomplished by enclosing the sources and targets in a chamber and reducing the air pressure therein, for example, to create a vacuum. In the preferred embodiment, however, the desired medium for the passage of alpha particles is obtained by displacing the air with a gas such as helium at atmospheric pressure. Helium has been found to be satisfactory in the present system since it has a low stopping power for alpha particles and hence allows a relatively high neutron output to be obtained. In addition, the desired medium in the chamber, for the passage of alpha particles, may be easily obtained and maintained by employing such a gas at atmospheric pressure.

The stopping power of helium compared with that of other gases is illustrated on page 315 of Nuclear Physics, Irving Kaplan, second edition, Addison-Wesley Publishing Company, Inc., Reading, Mass. As indicated, the stopping power of helium is substantially less than that of air. In this respect, the neutron yield is expected to be about 60% greater if helium rather than air is employed in the chamber of the present system. Helium is also particularly suitable in the present system due to its inert and noncombustible nature.

In the embodiment now to be described, the use of a gas of the type mentioned above at atmospheric pressure also is preferred due to the particular source employed. As mentioned previously, the use of polonium is preferred as an alpha source since polonium has a high specific activity. A suitable polonium source which has been found to be satisfactory is a commercially available source contained in a capsule having a thin metallic window for the passage of alpha particles. In one embodiment, the window is of stainless steel having a thickness of the order of 0.00015–0.00025 of an inch. The thin window contains the polonium and in addition minimizes the loss of energy of alpha particles in passing from the capsule which is desirable in the present system in order to increase the neutron yield. One of the problems encountered is that the very thin stainless steel window is susceptible to corrosion from moisture and hence rupture. This is to be avoided since polonium is highly unstable and tends to migrate. For example, if unenclosed, minute portions of polonium will break away from the main source and drift free. This could result in the production of undesirable neutron background in the present system and in addition present a possible health hazard.

The possibility of corrosion and hence rupture of the thin window is reduced by maintaining the sources in a noncorrosive environment which preferably is obtained by employing a dry gas of the type mentioned above. By displacing the air with such a gas at atmospheric pressure, changes in pressure across the very thin window are minimized which also is desirable in order to avoid rupture of the window.

In one embodiment, the pulsed polonium-beryllium source of the present invention is employed to carry out pulsed neutron logging operations to distinguish between oil-bearing and saltwater-bearing formations. In this embodiment, the logging operations are carried out by irradiating the formations with bursts of fast neutrons. These neutrons are thermalized in the formations and the resulting thermal neutrons are detected by a sensitive detector system to obtain the desired information. More particularly, many of the thermal neutrons formed in the formations diffuse into the borehole to the detector position. During the fast neutron burst, a certain density level of thermal neutrons is attained at the detector position. After the burst, this density level decreases with time as the formations absorb thermal neutrons that diffuse both away from and toward the vicinity of the detector. Measurements are made of thermal neutrons detected after each burst for the production of decay curves or continuous traces which reflect the density of thermal neutrons in the vicinity of the detector.

The decay curves obtained are representative of the variation of thermal neutron density detected versus time between bursts, while the continuous trace is representative of the total count rate or density of thermal neutrons detected within a selected time window following each burst of fast neutrons. The slope of the semilogarithmic plot of the decay curve is analyzed to determine whether the fluid-bearing formation contains salt water or oil. For example, if salt water is present rather than oil, the slope will reflect a shorter thermal neutron mean life and half life due to the large-capture cross section of chlorine of salt water. This phenomenon will be recorded by the continuous trace as a decrease in the density or count rate of the thermal neutrons detected within the desired time window.

The detector system employed for detecting the thermal neutrons preferably comprises a plurality of helium-3 proportional counters of the type disclosed in the United States Patent No. 3,102,198. These detectors have advantages in the present system since they are very sensitive to thermal neutrons and allow us to obtain suitable decay curves or continuous traces for distinguishing between oil-bearing and saltwater-bearing formations.

In accordance with a further aspect of the present invention, we have found that in distinguishing between oil- and saltwater-bearing formations, optimum results are obtainable with the system disclosed if the pulsed source is operated to produce bursts of neutrons having a length of the order of 500 microseconds and at a repetition rate of the order of 600 bursts per second. A burst length of the order of 500 microseconds is desirable in order to obtain an optimum count rate with the present system in both saltwater- and oil-bearing formations. Furthermore, at a repetition rate of the order of 600 bursts per second, the duration of each cycle is sufficient to allow a burst time of 500 microseconds and a quiescent time between bursts which corresponds to the time required for thermal neutrons to decay to background level in both saltwater- and oil-bearing formations.

For a more detailed description, reference is made to FIGURE 4 wherein curves A and B reflect the time distribution of the thermal neutron density formed respectively in saltwater- and oil-bearing formations when irradiated with bursts of fast neutrons. In the figure illustrated, a fast neutron burst occurs during the time period $t_1$. The curve portions during this time reflect the thermal neutron density buildup while the curve portions during time $t_2$ reflect the thermal neutron density decay following the termination of the burst. Curves A' and B' illustrate the thermal neutron density buildup which would occur if the bursts were of infinite time.

As can be understood, the level of the count rate in a given formation at any time during the decay period is dependent upon the density level prior to the termination of the neutron burst. To obtain an optimum count rate, it is desirable that the fast neutron burst length be sufficient to allow the thermal neutron density to reach at least a substantial portion of the equilibrium or saturation level. This level is realized for our purposes at least at about 80% of the maximum neutron density level possible for a burst length of infinite time. In most oil-bearing formations, it has been found that the thermal neutron density will reach substantially an equilibrium level in about 500 microseconds. A burst length of longer duration results in wasted time since only a small increase in the count rate will be realized.

It is also desirable to allow the thermal neutron density to reach substantially an equilibrium level to insure that the level of the count rate measured is due primarily to the effect of the formations and is independent of thermal neutron background. More particularly, in certain formations the time between neutron bursts may not be sufficient for the thermal neutrons formed to decay to background level. Under these conditions and if the bursts' lengths are substantially shorter than the time required for the thermal neutron density to reach an equilibrium level, the thermal neutron background from a prior cycle may contribute significantly and add to the level of the thermal neutron density produced within a subsequent cycle. In this case, the density measured within the subsequent cycle will not give an accurate indication of the mean life of the thermal neutrons produced. If, however, the thermal neutron density from each burst produced reaches a substantial equilibrium level during each cycle, the thermal neutron background cannot increase the density level to any significant amount.

The present system is operated in an optimum manner by driving the control means 20 with the motor 21 at a speed of 12,000 r.p.m. Since the flanges 22 and 23 each have three equally spaced apertures, 600 bursts per second will be obtained. At this rate, the time during each cycle is of the order of 1667 microseconds. By making the apertures 28 and 29 of control means 20 of a dimension sufficient to require 500 microseconds to pass intermediate the source-target pairs at 12,000 r.p.m., each burst will be of the order of 500 microseconds with 1167 microseconds between bursts. The latter time substantially corresponds to the time required for the thermal neutron density to decay to background level in oil-bearing formations which is of the order of 1000 microseconds. With a quiescent time of 1167 microseconds, we are able to obtain sensitive measurements near the end of the decay period, for example, beyond 500 microseconds after each burst.

As mentioned previously, the use of polonium as an alpha source is preferred due to its high specific activity. The relatively short half life of polonium (140 days), however, presents an economic factor which heretofore has limited its use. More particularly, due to the relatively short half life of polonium, the source becomes depleted of most of its radiation activity within a relatively short period of time. Thus, in the use of polonium, one is faced with the aspect of frequently replacing the sources if it is desired to maintain an output above a certain minimum level. This, of course, contributes to the cost, especially in our system where we employ a plurality of polonium sources.

In accordance with a further aspect of the present invention, we have found that by employing a unique source-manipulating technique, we are able to employ sources of short half life, such as polonium, in our system for longer time periods than heretofore expected and thus reduce the number of sources required with time in the maintenance of the system. With our technique, each source is depleted of a large percentage of its total radiation activity before replacement.

More particularly, as disclosed previously, our system is adapted to support six sources and six targets. In one embodiment, it is desired to maintain the total activity of the sources 24 and 25 above about seven curies. In this embodiment, each source when applied to the system has an activity of the order of three curies. With our technique, we are able to employ only twelve sources in the system the first year and seven sources each year thereafter, as now will be described.

Initially, only four sources (12 curies total activity) are applied to the system opposite four targets. The polonium, however, decays rapidly, due to its short half life, and in about two months the activity decays to about 8.88 curies. At this time, a fifth source is added to increase the total activity to about 11.88 curies. At four months a sixth source is added again to increase the total activity. Thereafter, at two-month intervals, the sources are replaced with fresh sources in a sequential manner to maintain the activity above the desired minimum value. More particularly, at six months one of the first sources initially applied to the system is replaced with a fresh source. At eight months, two of the original sources are replaced and at ten months the last of the original sources is replaced. The replacement procedure is then repeated beginning with the fifth source added to the system. The manipulating procedure is described in detail in the following table. As disclosed by Table B, all of the sources, except three of the initially applied sources, are employed in the system for time periods (8 months) corresponding to nearly twice the half life of the sources. During this time period, these sources are depleted of about 78% of their total activity.

the distance from the center of the control means to the center of apertures 31 was of the order of $17/32$ of an inch. The apertures 31 had a radial width of $3/16$ of an inch. The angle $\theta$ (FIGURE 3) defining the limits of apertures 31 and 28, 29 was of the order of thirty-six degrees.

TABLE B.—SCHEDULE FOR APPLYING AND REMOVING SOURCES

| Time | $Po^{210}$ Activity (Curies) | Percent Original Output | Sources in Use (Nos.) | Source Manipulation |
|---|---|---|---|---|
| 0 | 12 | 100 | 1, 2, 3, 4 | Load tool initially with four sources. |
| 2 months | 8.88 | 74 | 1, 2, 3, 4 | |
| | 8.88+3=11.88 | 99 | 1, 2, 3, 4, 5 | Add source No. 5. |
| 4 months | 8.79 | 73.3 | 1, 2, 3, 4, 5 | |
| | 8.79+3=11.79 | 98.3 | 1, 2, 3, 4, 5, 6 | Add source No. 6. |
| 6 months | 8.72 | 72.7 | 1, 2, 3, 4, 5, 6 | Remove Source No. 1 (now 1.23 curies—59% depleted). |
| | 8.72−1.23+3=10.49 | 87.4 | 2, 3, 4, 5, 6, 7 | Add source No. 7. |
| 8 months | 7.76 | 64.7 | 2, 3, 4, 5, 6, 7 | Remove sources Nos. 2 and 3 (now 0.90 curies each—70% depleted). |
| | 7.76−1.80+6=11.96 | 99.67 | 4, 5, 6, 7, 8, 9 | Add sources Nos. 8 and 9. |
| 10 months | 8.85 | 73.7 | 4, 5, 6, 7, 8, 9 | Remove source No. 4 (now 0.66 curies—78% depleted). |
| | 8.85−0.66+3=11.19 | 93.3 | 5, 6, 7, 8, 9, 10 | Add source No. 10. |
| 12 months | 8.28 | 69 | 5, 6, 7, 8, 9, 10 | Remove source No. 5 (now 0.66 curies—78% depleted). |
| | 8.28−0.66+3=10.62 | 88.5 | 6, 7, 8, 9, 10, 11 | Add source No. 11. |
| 14 months | 7.86 | 65.5 | 6, 7, 8, 9, 10, 11 | Remove source No. 6 (now 0.66 curies—78% depleted). |
| | 7.86−0.66+3=10.20 | 85.0 | 7, 8, 9, 10, 11, 12 | Add source No. 12. |
| 16 months | 7.55 | 62.9 | 7, 8, 9, 10, 11, 12 | Remove source No. 7 (now 0.66 curies—78% depleted). |
| | 7.55−0.66+3=9.89 | 82.4 | 8, 9, 10, 11, 12, 13 | Add source No. 13. |
| 18 months | 7.30 | 60.8 | 8, 9, 10, 11, 12, 13 | Remove sources Nos. 8 and 9 (now 0.66 curies each—78% depleted). |
| | 7.30−1.32+6=11.98 | 99.83 | 10, 11, 12, 13, 14, 15 | Add sources Nos. 14 and 15. |
| 20 months | 8.29 | 73.9 | 10, 11, 12, 13, 14, 15 | Remove source No. 10 (now 0.66 curies—78% depleted). |
| | 8.87−0.66+3=11.21 | 93.4 | 11, 12, 13, 14, 15, 16 | Add source No. 16. |
| 22 months | 8.29 | 69.0 | 11, 12, 13, 14, 15, 16 | Remove source No. 11 (now 0.66 curies—78% depleted). |
| | 8.29−0.66+3=10.63 | 88.6 | 12, 13, 14, 15, 16, 17 | Add source No. 17. |

In a detailed description of the logging system and referring to FIGURES 2B, 3, 5, and 6, the sources 24, 25 and the targets 26, 27 are supported respectively by support members 40 and 41. Each member 40 is provided to support one source, while each member 41 supports two targets. Each source is coupled to a member 40 by way of stem 42 which is inserted in aperture 43 of support member 40 and secured therein by a set screw 44. Two targets are secured to each side of a support member 41 by means not shown. The source support members 40 are removably coupled to center core members 45 and 46 by way of set screws 47. The target support members 41 are removably attached beneath center portions 48 of a sleeve 49 (FIGURE 7) by set screws 50 (see also FIGURE 3). Apertures 51 of sleeve 49 are provided to allow the operator convenient access to the sources for the removal and replacement when desired.

The sources and targets are mounted in an air-tight chamber formed by casing structure 60 (FIGURES 2A and 2B) and an end plate member 61 (FIGURE 2B). A head 62 threadedly is attached to the bottom end portion of the casing 60 and encloses an injection valve 63 and a bleed valve 64 which are employed for filling the chamber with helium. In carrying out the helium injection operation, head 62 is removed and helium is injected into the chamber through valve 63 while the bottom end portion of the casing is supported in a lowered position. The helium passes into the chamber by way of tubes 65 and rises in the chamber through apertures (not shown) while air is withdrawn through bleed valve 64. In addition to the use of dry helium for reducing corrosion of the window covering of the polonium sources, a commercially available drying agent, supported in container 66, is provided for absorbing any excess moisture in the chamber or helium gas.

In other features of the present system, the control means 20, in one embodiment, was of stainless steel and had an outside diameter of $2\%_{16}$ inches. The distance from the center of the control means to the base of apertures 28 and 29 was of the order of 0.875 of an inch, while The motor 21 for driving the shutter control means 20 comprises a 115 volt, 400 cycle synchronous motor having a top speed of 12,000 r.p.m. The motor is energized by power supply 70 (FIGURE 1) provided at the surface and which includes an autotransformer 71. More particularly, the power supply is coupled to the motor 21 by way of conductors 72, brushes and slip rings illustrated at 73 and 74, conductors 75 of cable 76, and conductors 77. As can be understood, the position of arm 78 of autotransformer 71 can be varied to start and stop the motor 21. Referring to FIGURE 6, magnets 79 of opposite polarity, supported by one of the source support members 40, are provided to insure that the solid portions of rims 22 and 23 of the control means 20 stop between the sources and the targets when the control means stops rotating.

In the preferred embodiment, five helium-3 detectors (only three are shown) of the type mentioned above, coupled together in parallel, are employed for detecting thermal neutrons. Referring to FIGURE 1, the high voltage for these detectors is obtained from a power supply 80 (provided in borehole unit 10) coupled to conductors 75. The outputs of the detectors are amplified at 81 and applied to the surface through a coaxial cable 82 of cable 76. The output of the magnetic pickup device 30 is applied to the surface by way of coaxial cable 83. At the surface, the outputs of the detectors are applied to the analyzers 16 and 18 by way of amplifier 84 and single channel pulse height analyzer 85. At the surface, the output from the magnetic pickup device 30 is applied to analyzers 16 and 18 by way of amplifier 86 and clip circuit 87, mentioned previously.

Although a thermal neutron detector system is employed in the preferred embodiment, it is to be understood that a gamma ray detector instead may be employed to obtain desired measurements. Such a detector may comprise a scintillation crystal coupled to a photomultiplier tube or a solid state counter of the type described in United States Patent No. 3,312,823, issued April 4, 1967, entitled Semiconductor Radiation Detector for Use in Nuclear Well Logging, Tom W. Bonner et al., and assigned to the same assignee as the present application.

The analyzer 16 comprises a multichannel time analyzer which has a plurality of windows, each of which sequentially opens and closes to accept pulses from the analyzer 85. The pulses accepted by each window are summed and sequentially applied to readout 17, which may be an oscilloscope, for the production of a decay curve 88.

Analyzer 18 comprises a single-channel time analyzer coupled to recorder 19, by way of count rate meter 88', and employed for the production of a continuous trace 89 representative of the intensity of radiation detected within a given time window following each sync pulse. The single-channel time analyzer 18 employed may be a delay generator plus a linear gate circuit or of the type described in United States Patent No. 3,304,424, issued Feb. 14, 1967, and entitled Radioactive Well Logging Technique for Logging for the Sodium-24 Isomer, by William R. Mills, Jr., and assigned to the same assignee as the present invention. As described therein, the single-channel time analyzer comprises a time-to-pulse height converter of the type described in "Time-to-Pulse Height Converter of Wide Range" by Joachim Fischer and Arne Lundby, The Review of Scientific Instruments, volume 31, No. 1, January 1960, a saw-tooth and gate-pulse generator, and a single-channel pulse height analyzer. As disclosed in the above-mentioned application, the time-to-pulse height converter produces output pulses having heights dependent upon the time of detection of radiation following each sync pulse. These output pulses are selected according to height by the pulse height analyzer, the output of which is applied to the count rate meter 88'.

A motor 90, coupled to drum 91 by mechanical connection 92, is provided to move the unit 10 along the borehole. The chart of the recorder 19 is driven in correlation with depth by sheave 93 and a selsyn system including an electrical connection 94. The depth at which the logging activity is carried out may be read also from meter 95.

In other features of the borehole system, the magnetic pickup device 30 is supported in aperture 96 (FIGURE 2B) of core member 45. The thermal neutron detectors 15 are supported by support member 97 coupled to casing structure 60 by coupling member 98. Support member 97 comprises a cylindrical-shaped member having five apertures extending longitudinally therethrough for supporting the detectors. As illustrated, a central aperture 99 is provided through member 97 for electrical leads which extend through end plate 61.

In one embodiment, the polonium sources employed were manufactured by Monsanto Research Corporation, Dayton, Ohio. Referring to FIGURE 8, one of the sources is disclosed. The source employed comprises a thin polonium deposit 100 on a stainless steel base 101. A stainless steel window 102 having a thickness of 0.00015 inch to 0.00025 inch, as mentioned previously, is supported between two platinum washers 103 and 104. A cup-shaped member 105 is provided for securing the components together. The effective diameter of the window shown is of the order of seven millimeters. The alpha particles emitted from the polonium source had an energy of about 5.3 mev. and lost about 1.8 mev. in passing through the stainless steel window. In one embodiment, each source and associated target was positioned about 0.15 centimeter apart for the production of bursts of neutrons having an average energy of about 4.5 mev.

The magnetic sensing device for producing sync pulses was of the type manufactured by Electro Products Laboratory, Inc., Chicago, Ill., Model 3055-A. The magnetic core of the device employed had a diameter of 0.040 of an inch. The sync pulses produced had a rise time of the order of 20–30 microseconds and a fall time of the same duration.

The synchronous motor 21 was of the type manufactured by Globe Industries, Dayton, Ohio, Part No. 75A-106-2. With the control means disclosed, in one embodiment, the rise and fall times of each burst of fast neutrons were of the order of 150 microseconds, and the total time period of each burst including the rise and fall times was of the order of 500 microseconds.

The multichannel time analyzer 16, disclosed, may be of the type manufactured by the Technical Measurement Corporation, New Haven, Conn., Model No. CN–110, including a plug-in Model 211, Time-of-Flight Logic Circuit. The pulse height analyzer 85 may be of the type manufactured by Hamner Electronic Company, Inc., Princeton, N.J., Model No. N–603 or N–686.

Now that the invention has been described, modifications will become apparent to those skilled in the art, and it is intended to cover such modifications as fall within the scope of the appended claims.

What is claimed is:

1. A pulsed radiation system comprising:
   means for suporting at least one first source in a first plane,
   means for supporting at least one second source in a second plane spaced from said first source,
   said sources being characterized by the emission of radiation of the same nature and located opposite each other in said first and second planes,
   said sources being positioned to direct radiation toward a zone located intermediate said sources and in a third plane,
   target material located in said zone and forming a target for radiation emitted by said sources,
   said material being characterized by the emission of primary radiation when irradiated with radiation from said sources, and
   control means for periodically and simultaneously exposing said target material to radiation emitted from both of said sources for the production of bursts of primary radiation.

2. The system of claim 1 wherein:
   said control means includes structure supported for movement intermediate said sources and target material for shielding said target material from radiation emitted by said sources,
   means for periodically moving and removing said structure respectively intermediate and from intermediate said sources and target material to simultaneously expose said target material to radiation emitted from both of said sources only during spaced time periods for the production of bursts of primary radiation, and
   means responsive to the position of said control means for producing periodically a sync pulse associated with each burst of primary radiation produced.

3. The system of claim 1 wherein:
   said sources are characterized by the emission of alpha particles,
   said target material being characterized by the emission of fast neutrons when irradiated with alpha particles, and
   means forming a chamber for enclosing at least said sources and said target material and having an atmosphere consisting substantially of helium at about atmospheric pressure.

4. The system of claim 1 wherein:
   said first, second, and third planes are substantially parallel to each other,
   a plurality of sources located in each of said first and second planes, the total number of sources being equal to $n$,
   each source in said first plane being located at a position opposite a source in said second plane to form pairs of opposite sources,
   each pair of opposite sources being positioned to direct radiation toward an intermediate zone located in said third plane,
   target material located in each of said zones and forming a target for radiation emitted by opposite sources, said material being characterized by the emission of primary radiation when irradiated with radiation from said sources, each source and associated target forming a source-target pair, the total number of source-target pairs beign equal to $n$, said control means including first means supported for rotation intermediate said sources in said first plane and associated targets and second means supported for rotation intermediate said sources in said second plane and associated targets, said first and second means being of a selected material having a thickness sufficient to be impervious to radiation emitted from said sources, said first and second means each having a plurality of apertures extending therethrough at the same radius from the center of rotation to allow radiation from said sources to irradiate said targets upon rotation of said control means, the total number of apertures being equal to $n$, in each of said first and second planes said sources being spaced apart by equal angles, said apertures formed in said first and second means being spaced apart by equal angles whereby at a plurality of angular positions of said control means one of each of said apertures is located intermediate one of each of said source-target pairs, and means for rotating said control means including said first and second means to periodically allow radiation from said sources to irradiate said targets to produce bursts of primary radiation spaced in time.

5. The system of claim 1 wherein:

said target material is characterized by the emission of fast neutrons when irradiated with radiation from said sources, said control means including first means supported for rotation intermediate one of said sources and said target material and second means supported for rotation intermediate the other of said sources and said target material, said first and second means being of a selected material having a thickness sufficient to be impervious to radiation emitted by said sources, said first and second means each having at least one aperture extending therethrough, said apertures being in alignment, upon rotation of said control means, said apertures passing simultaneously intermediate said target material and said sources to allow radiation from both of said sources simultaneously to irradiate said target material for the production of fast neutrons.

6. A pulsed radiation logging system comprising:

a borehole tool adapted to be inserted into a borehole, means located in said tool for supporting in a first plane at least one radioactive source characterized by the continuous emission of charged particles, a target located in said tool and supported in a second plane spaced from said source and characterized by the emission of primary radiation when irradiated with said charged particles, the output of primary radiation from said target increasing with the energy of said particles upon interaction therewith, said source being positioned to direct said particles toward said target, control means located in said tool for presenting a path for the passage of said particles to said target only during spaced time periods for the production of bursts of primary radiation spaced in time, and means forming a chamber enclosing at least said source and target and having an atmosphere, the pressure of which is substantially less than atmospheric pressure whereby the loss in energy of said particles per unit distance in traversing said path is substantially less than in air at atmospheric pressure.

7. The system of claim 6 for use in investigating formations traversed by a borehole wherein:

said source is characterized by the emission of alpha particles, said target being characterized by the emission of fast neutrons when irradiated with alpha particles, said control means being of a selected material having a thickness sufficient to be impervious to radiation emitted by said source, said control means being supported for rotation intermediate said source and target, said control means having at least one aperture formed therethrough for passage intermediate said source and target upon rotation of said control means, said path being formed upon passage of said aperture intermediate said source and target to allow alpha particles from said source to irradiate said target for the production of fast neutrons.

8. A pulsed radiation system comprising:

means for supporting in a first plane at least one radioactive source characterized by the emission of charged particles, a target supported in a second plane spaced from said source and characterized by the emission of primary radiation when irradiated with said charged particles, the output of primary radiation from said target increasing with the energy of said particles upon interaction therewith, said source being positioned to direct said particles toward said target, means forming a chamber enclosing at least said source and target, said chamber having an atmosphere consisting substantially of a gas having an atomic number less than three, and control means for presenting a path through said gas for the passage of said particles to said target only during spaced time periods for the production of bursts of primary radiation spaced in time, the loss in energy of said particles per unit distance in traversing said path, when said atmosphere is at a given pressure and temperature, being less than in air under the same conditions of pressure and temperature.

9. A pulsed radiation well logging system for logging the formations traversed by a borehole, comprising:

a borehole unit for traversing a borehole and containing at least one source characterized by the emission of alpha particles, a target spaced from said source for emitting fast neutrons when exposed to alpha particles, means for periodically exposing said target to alpha particles emitted by said source only during predetermined time intervals to produce bursts of fast neutrons, means forming a chamber for enclosing at least said source and said target and having an atmosphere consisting substantially of helium at about atmospheric pressure, said fast neutrons irradiating the formations for the production of thermal neutrons, at least one helium-3 proportional counter located in said unit for detecting thermal neutrons passing from the formations into the borehole, and means coupled to said counter for measuring the intensity of thermal neutrons detected.

10. A pulsed radiation system comprising:

means for supporting in a first plane a plurality of spaced sources characterized by the emission of radiation, the total number of sources being equal to $n$, at least $n$ targets spaced from each other for emitting primary radiation when exposed to radiation from said sources, said targets being located in a second plane spaced from said first plane, one of each of said targets being associated with one of each of said sources to form *n* source-target pairs, control means of a selected material having a thickness sufficient to be impervious to radiation emitted from said sources, said control means being supported for rotation intermediate said sources and targets respectively in said first and second planes, said control means having at least *n* apertures extending therethrough at a given radius from the center of rotation for allowing radiation from said sources to irradiate said targets upon rotation of said control means, said source-target pairs being located at said radius and equally spaced apart by a given angle with respect to the center of rotation, said apertures being spaced apart by equal angles with respect to the center of rotation whereby at a plurality of angular positions of said control means one of each of said apertures is located intermediates one of each of said source-target pairs, and means for rotating said control means periodically to allow radiation from said sources to irradiate said targets to produce bursts of primary radiation spaced in time.

11. The system of claim 10 for use in investigating the formations traversed by a borehole wherein:

*n* is equal to at least three, said sources being characterized by emission of alpha particles and said targets being characterized by emission of fast neutrons when irradiated with alpha particles, said last-named means being adapted to rotate said control means at an angular velocity sufficient to produce bursts of fast neutrons at a repetition rate of the order of 600 bursts per second, said apertures having a dimension such that about 500 microseconds are required for said apertures to pass intermediate said source-target pairs upon rotation of said control means at said angular velocity whereby the duration of each burst of neutrons is of the order of 500 microseconds.

12. A pulsed radiation system for use in logging the formations traversed by a borehole, comprising:

means for supporting at least one source in a first plane, means for supporting at least one source in a second plane spaced from said first plane, said sources being characterized by the emission of alpha particles and located opposite each other in said first and second planes, said sources being positioned to direct alpha particles toward a zone located intermediate said sources in a third plane, target material located in said zone and forming a target for alpha particles emitted by said sources, said target material being characterized by the emission of fast neutrons when irradiated with alpha particles, control means including first means supported for rotation intermediate one source and said target material and second means supported for rotation intermediate the other of said sources and said target material, said first and second means being of a selected material having a thickness sufficient to be impervious to alpha particles, said first and second means each having at least one aperture extending therethrough to allow radiation from said sources to irradiate said target material upon rotation of said control means, said apertures being in alignment whereby at least at one angular position of said control means one of each of said apertures is located intermediate said target material and one of each of said sources to allow radiation from both of said sources simultaneously to irradiate said target material for the production of fast neutrons, and means for rotating said control means at a desired speed to produce bursts of fast neutrons.

13. A pulsed radiation system for use in logging the formations traversed by a borehole, comprising:

means for supporting at least one source in a first plane, said source being characterized by the emission of alpha particles, at least one target located in a second plane spaced from said source, said target being characterized by the emission of fast neutrons when irradiated with alpha particles, control means of a selected material having a thickness sufficient to be impervious to alpha particles, said control means being supported for rotation intermediate said source and said target and having at least one aperture extending therethrough at a given radius from the center of rotation, said source and said target being located at said radius whereby upon rotation of said control means said aperture passes intermediate said source and target to allow alpha particles to irradiate said target for the production of bursts of fast neutrons, means for rotating said control means at a desired speed to produce bursts of fast neutrons, and means forming a chamber for enclosing at least said source and said target and having an atmosphere consisting substantially of helium at about atmospheric pressure.

14. A pulsed radiation system for use in logging the formations traversed by a borehole, comprising:

means for supporting at least one source in a first plane, means for supporting at least one source in a second plane spaced from said first plane, said sources being characterized by the emission of alpha particles and located opposite each other in said first and second planes, said sources being positioned to direct alpha particles toward a zone located intermediate said sources in a third plane, target material located in said zone and forming a target for alpha particles emitted by said sources, said material being characterized by the emission of fast neutrons when irradiated with alpha particles, control means including first means supported for rotation intermediate one source and said target material and second means supported for rotation intermediate the other of said sources and said target material, said first and second means being of a selected material having a thickness sufficient to be impervious to alpha particles, said first and said second means each having at least one aperture extending therethrough, said apertures being in alignment whereby at least at one angular position of said control means one of each of said apertures is located intermediate said target material and one of each of said sources to allow radiation from both of said sources simultaneously to irradiate said target material for the production of fast neutrons, means for rotating said control means including said first and second means at a desired speed to produce bursts of fast neutrons, means responsive to the position of said control means for producing a sync pulse associated with each burst of fast neutrons, and means forming a chamber for enclosing at least said sources and said target material and having an atmosphere consisting substantially of helium at about atmospheric pressure.

15. The system of claim 14 wherein:

said control means is rotated to produce bursts of fast neutrons each having a time duration about equal to the time required for the intensity of thermal neutrons formed in the formations to reach substantially an equilibrium level in oil-bearing formations, the time between bursts being about equal to the time required for thermal neutrons to decay to background level in oil-bearing formations.

16. The system of claim 14 wherein:

said means for rotating said control means rotates said control means at an angular velocity sufficient to produce bursts of fast neutrons at a repetition rate of the order of 600 bursts per second, said apertures having a dimension such that about 500 microseconds are required for said apertures to pass intermediate said sources and said target material upon rotation of said control means at said angular velocity whereby the duration of each burst of neutrons is of the order of 500 microseconds.

17. The system of claim 16 including:

at least one helium-3 proportional counter for detecting thermal neutrons passing from the formations into the borehole, and means coupled to said sync pulse producing means and responsive to the output of said counter for measuring the intensity of thermal neutrons detected for distinguishing between oil- and saltwater-bearing formations.

18. A pulsed radiation system comprising:

means for supporting at least one source characterized by the emission of alpha particles, at least one target spaced from said source, said target being characterized by the emission of neutrons when irradiated with alpha particles emitted by said source, control means including structure supported for movement intermediate said source and target for shielding said target from alpha particles emitted by said source, means for periodically moving and removing said structure respectively intermediate and from intermediate said source and target to expose said target to alpha particles emitted by said source only during spaced time periods for the production of bursts of fast neutrons, means responsive to the position of said control means for periodically producing a sync pulse associated with the production of each burst of fast neutrons, and means for forming a chamber for enclosing at least said source and said target and having an atmosphere consisting substantially of helium.

19. A pulsed radiation system comprising:

means for supporting in a first plane a plurality of spaced sources characterized by the emission of radiation, the total number of sources being equal to $n$, at least $n$ targets spaced from each other for emitting primary radiation when exposed to radiation from said sources, said targets being located in a second plane spaced from said first plane, one of each of said targets being associated with one of each of said sources to form $n$ source-target pairs, control means including structure supported for rotation intermediate said sources and targets, respectively, in said first and second planes, said structure of said control means having a plurality of apertures extending therethrough at a predetermined radius from the center of rotation to allow radiation from said sources to irradiate said target upon rotation of said control means, the total number of apertures being equal to $n$, said source-target pairs being spaced apart by equal angles with respect to the center of rotation, said apertures formed in said structure of said control means being spaced apart by equal angles with respect to the center of rotation whereby at a plurality of angular positions of said control means one of each of said apertures is located intermediate one of each of said source-target pairs, means for rotating said control means periodically to allow radiation from said sources to irradiate said targets to produce bursts of primary radiation spaced in time, and means responsive to the position of said structure of said control means for periodically producing a sync pulse associated with each burst of primary radiation produced.

20. A pulsed radiation system comprising:

means for supporting at least one radioactive source characterized by the emission of alpha particles, a target supported at a position spaced from said source and characterized by the emission of primary radiation when irradiated with alpha particles, the output of primary radiation from said target increasing with the energy of alpha particles interacting therewith, said source being positioned to direct said alpha particles toward said target, control means for presenting a path for the passage of alpha particles to said target only during spaced time periods for the production of bursts of primary radiation spaced in time, and means forming a chamber enclosing at least said source and target and having an atmosphere consisting substantially of helium, said path formed for the passage of alpha particles to said target extending through said helium.

21. A pulsed radiation system comprising:

a source characterized by the continuous emission of radiation, a target characterized by the emission of primary radiation when exposed to radiation emitted by said source, the output of primary radiation from said target increasing with the energy of radiation emitted from said source and interacting with said target, means supported for periodic movement for periodically exposing said target to radiation emitted by said source only during spaced time intervals to produce bursts of primary radiation spaced in time, and means forming a chamber enclosing at least said source and target and having an atmosphere consisting substantially of a gas having an atomic number less than 3, the loss in energy of said radiation emitted by said source per unit distance in passing through said atmosphere, when said atmosphere is at a given pressure and temperature, being less than in air under the same conditions of pressure and temperature.

22. A pulsed radiation system comprising:

a source characterized by the emission of radiation, a target characterized by the emission of primary radiation when exposed to radiation emitted by said first source, the output of primary radiation from said target increasing with the energy of radiation emitted from said source and interacting with said target, means supported for periodic movement for periodically exposing said target to radiation emitted by said source only during spaced time intervals to produce bursts of primary radiation spaced in time, and means forming a chamber enclosing at least said source and target, said chamber having an atmosphere consisting substantially of helium.

23. The system of claim 22 wherein:

said source is supported in a first plane, said target being supported in a second plane spaced from said source, and control means for presenting a path for the passage of radiation from said source to said target only during spaced time periods for the production of bursts of primary radiation spaced in time.

24. The system of claim 23 wherein:
said control means includes structure supported for movement intermediate said source and target,
said structure being impervious to radiation emitted from said source, and
means for periodically moving and removing said structure respectively intermediate and from intermediate said source and target to expose said target to radiation emitted from said source only during spaced time periods for the production of bursts of primary radiation.

25. The system of claim 24 wherein:
said means for moving said structure comprises means for rotating said structure to periodically expose said target to radiation emitted from said source for the production of bursts of primary radiation,
said source emitting alpha particles,
said target emitting fast neutrons upon interaction therewith of alpha particles.

26. The system of claim 22 wherein:
said chamber is filled with helium at about atmospheric pressure.

27. A pulsed radiation system comprising:
means for supporting at least one source in a first plane,
means for supporting at least one source in a second plane spaced from said first source,
the total number of sources being equal to $n$ and characterized by the emission of radiation of the same nature,
at least $n$ targets located intermediate said first and second planes,
one of each of said targets being associated with one of each of said sources to form $n$ source-target pairs,
said targets being characterized by the emission of primary radiation when exposed to radiation from said sources,
each source being positioned to direct radiation toward its associated target, and
control means for periodically and simultaneously exposing said targets to radiation emitted from said associated sources for the production of bursts of primary radiation.

28. The system of claim 2 wherein:
said sources are characterized by the emission of alpha particles,
said target material being characterized by the emission of fast neutrons when irradiated with alpha particles, and
means forming a chamber for enclosing at least said sources and said target material and having an atmosphere consisting substantially of helium.

29. The system of claim 4 comprising:
means responsive to the position of said control means for producing periodically sync pulses associated with each burst of primary radiation.

30. The system of claim 29 wherein:
said sources are characterized by the emission of alpha particles,
said target material being characterized by the emission of fast neutrons when irradiated with alpha particles, and
means forming a chamber for enclosing at least said sources and said target material and having an atmosphere consisting substantially of helium.

31. The system of claim 10 wherein:
said sources are characterized by the emission of alpha particles,
said targets are characterized by the emission of fast neutrons when irradiated with alpha particles, and
means forming a chamber for enclosing at least said source and said targets and having an atmosphere consisting substantially of helium.

32. The system of claim 31 comprising:
means responsive to the position of said control means for producing periodically a sync pulse associated with each burst of fast neutrons.

References Cited
UNITED STATES PATENTS 2,275,748   3/1942   Fearon _____ 250—84.5 X
2,991,364   7/1961   Goodman _____ 250—83.6 X ARCHIE R. BORCHELT, *Primary Examiner.*